United States Patent
Nakamura et al.

(10) Patent No.: US 7,494,588 B2
(45) Date of Patent: Feb. 24, 2009

(54) WASTEWATER PURIFICATION SYSTEM

(75) Inventors: Sakujiro Nakamura, Tokyo (JP); Seiji Yokoi, Tokyo (JP); Yasuo Kodera, Tokyo (JP)

(73) Assignee: Itochu Forestry Corp., Tokyo (JP)

( * ) Notice: Subject to any disclaimer, the term of this patent is extended or adjusted under 35 U.S.C. 154(b) by 373 days.

(21) Appl. No.: 10/585,908

(22) PCT Filed: Apr. 7, 2004

(86) PCT No.: PCT/JP2004/005023

§ 371 (c)(1),
(2), (4) Date: Jul. 12, 2006

(87) PCT Pub. No.: WO2005/068379

PCT Pub. Date: Jul. 28, 2005

(65) Prior Publication Data

US 2008/0230472 A1    Sep. 25, 2008

(51) Int. Cl.
C02F 3/00 (2006.01)

(52) U.S. Cl. .............. 210/614; 210/620; 210/743; 210/746

(58) Field of Classification Search ............... 210/614, 210/620, 743, 746

See application file for complete search history.

(56) References Cited

U.S. PATENT DOCUMENTS

| | | | |
|---|---|---|---|
| 5,608,171 A * | 3/1997 | Hunter et al. | 73/861.63 |
| 5,719,559 A | 2/1998 | Talbott et al. | |
| 6,569,336 B1 * | 5/2003 | Mouchet et al. | 210/614 |
| 6,609,070 B1 * | 8/2003 | Lueck | 702/50 |
| 6,954,701 B2 * | 10/2005 | Wolfe | 702/22 |

FOREIGN PATENT DOCUMENTS

| | | |
|---|---|---|
| JP | 5-126980 | 5/1993 |
| JP | 9-122681 | 5/1997 |
| JP | 10-512077 | 11/1998 |
| JP | 2000-288574 | 10/2000 |

(Continued)

OTHER PUBLICATIONS

International Search Report, dated Sep. 7, 2004, corresponding to PCT/JP2004/005023.

(Continued)

*Primary Examiner*—Chester T Barry
(74) *Attorney, Agent, or Firm*—Christie, Parker & Hale, LLP (57) ABSTRACT

An object of the present invention is to provide a control method, for a wastewater purification system, where the status of a wastewater purification system employing a batch activated sludge process is accurately understood by analyzing the data waveforms of DO, ORP and pH. In the control method for a wastewater purification system, an aeration device is controlled by a programmable sequencer, a controller acquires respective data waveforms from a first sensor, a second sensor and a third sensor and the control status data of the programmable sequencer, the controller analyzes the data waveform of dissolved oxygen concentration from the first sensor, the data waveform of oxidation-reduction potential from the second sensor, and the data waveform of hydrogen ion concentration from the third sensor, and the controller performs an alarm process when a deviation from a previously fixed normal state is discovered as a result of the analysis.

10 Claims, 6 Drawing Sheets

FOREIGN PATENT DOCUMENTS

JP          2001-353493          12/2001

OTHER PUBLICATIONS

Patent Abstract of Japan, Publication 05126980 A, Published May 25, 1993, in the name of Matsumoto.
Patent Abstract of Japan, Publication 09122681 A, Published May 13, 1997, in the name of Hamamoto, et al.
Patent Abstract of Japan, Publication 2000288574 A, Published Oct. 17, 2000, in the name of Takemura, et al.
Patent Abstract of Japan, Publication 2001353493 A, Published Dec. 25, 2001, in the name of Kudo, et al.
Nakamura, S., *Wastewater Purification in Piggery*, Toyo-Publication Co., Ltd., Apr. 28, 2003, pp. 69-70 and 188-192 and Information List (Form 1) with English Summary.

* cited by examiner

WASTEWATER PURIFICATION SYSTEM

CROSS-REFERENCE TO RELATED APPLICATION

This application is a National Phase Patent Application of International Application No. PCT/JP2004/005023, filed on Apr. 7, 2004, which claims priority of Japanese Patent Application No. 2004-005303, filed on Jan. 13, 2004.

FIELD OF THE INVENTION

The present invention relates to a control method for a wastewater purification system employing a batch activated sludge process.

BACKGROUND OF THE INVENTION

As described, for example, in Kokai (Japanese Unexamined Patent Publication) No. 2001-212583, treatment of the livestock waste in a composite lagoon-type clarification tank is known.

Also, in a wastewater purification system for purifying livestock waste-containing wastewater by a batch activated sludge process, when permanent sensors for DO (dissolved oxygen in water), ORP (oxidation-reduction potential) and pH (hydrogen ion concentration) are provided and the data are continuously recorded, there appear sensor data waveforms having constant patterns according to the difference in the conditions such as the amount and quality of activated sludge, the inflow load, the aeration output and aeration time, and the accumulation degree of ammonia, nitrous acid and nitric acid in the reaction tank. Conventionally, an automatic control system where a field supervisor modifies the operating program thereof on the basis of the meaning of such a waveform or where the aeration is automatically stopped when a numerical value of a mater relay corresponding to DO or ORP is reached to a certain numerical value, has been employed.

However, the meter relay system of controlling aeration only by the numerical value of DO, ORP or pH has a problem that good control cannot be satisfactorily obtained.

The sensor data waveforms may be classified into patterns according to the above-described various conditions, but the field supervisor is required to have considerable experience and training to allow appropriate judgment and if this judgment is incorrect, underaeration, overaeration or the like results, and a predetermined function cannot be maintained. Incidentally, when the function cannot be maintained, a professional engineer is called to the field, but in the case where the professional engineer is located at a remote site, the response is not quick in many cases. Furthermore, because no means for automatically judging the level of adequacy of the aeration control is available, unnecessary power consumption and failure to satisfactorily fulfill the function occur.

SUMMARY OF THE INVENTION

Under these circumstances, an object of the present invention is to provide a control method, for a wastewater purification system, where the status of a wastewater purification system employing a batch activated sludge process is accurately understood by analyzing the data waveforms of DO, ORP and pH.

Another object of the present invention is to provide a control method for a wastewater purification system, where alert generation, data transmission, remote monitoring and modification of the operating program from a remote site can be effected by an automatic data analysis so as to facilitate the management of correct operations in a timely fashion.

In order to attain these objects, the method for controlling a wastewater purification system according to the present invention is that an aeration device is controlled by a programmable sequencer, a controller acquires respective data waveforms from a first sensor, a second sensor and a third sensor and the control status data of the programmable sequencer, the controller analyzes the data waveform of dissolved oxygen concentration from the first sensor, the data waveform of oxidation-reduction potential from the second sensor, and the data waveform of hydrogen ion concentration from the third sensor, and the controller performs alarm processing when a deviation from a previously fixed normal state is discovered as a result of the analysis.

In the method for controlling a wastewater purification system according to the present invention, the controller preferably discovers a deviation from the normal state by comparing the data waveform of dissolved oxygen concentration, the data waveform of oxidation-reduction potential and the data waveform of hydrogen ion concentration with previously prepared reference conditions.

In the method for controlling a wastewater purification system according to the present invention, the controller preferably records the data waveform of dissolved oxygen concentration, the data waveform of oxidation-reduction potential and the data waveform of hydrogen ion concentration.

In the method for controlling a wastewater purification system according to the present invention, alarm processing preferably automatically transmits the occurrence of an abnormality to a remote site over a phone line.

In the method for controlling a wastewater purification system according to the present invention, the program of the programmable sequencer is preferably modifiable.

In the method for controlling a wastewater purification system according to the present invention, the program of the programmable sequencer is preferably modifiable from a remote site.

In the method for controlling a wastewater purification system according to the present invention, the wastewater purification system preferably includes a solid matter-removing device, a raw water tank, a raw water storage tank, a treated water-drawing device, and an extracting and dehydrating device for excess activated sludge.

In the method for controlling a wastewater purification system according to the present invention, the wastewater purification system preferably includes a device for separating the treated water from the activated sludge by using a microfiltration membrane, an ultrafiltration membrane or a reverse osmosis membrane, which is disposed in the reaction tank or is separate therefrom.

In the method for controlling a wastewater purification system according to the present invention, the reaction tank preferably has a circular or elliptical plan shape and a mortar-type cross-sectional shape and has an inclined part shielded from water by concrete or an asphalt sheet.

In the method for controlling a wastewater purification system according to the present invention, the BOD volume load of the reaction tank is preferably from 0.1 to 0.4 kg/m$^3$·day.

According to the present invention, the data waveform information is automatically analyzed and when the desired waveform does not appear, an alert is automatically generated and this alert can be automatically sent to the facility administrator or a professional engineer. Furthermore, the facility administrator or professional engineer can modify the operating program even from a remote site, whereby the mechanical operating conditions such as aeration output and aeration time can be adjusted and the purification function can be stably maintained while providing proper aeration and minimum power consumption. Accordingly, even when the field supervisor is deficient in technical skill or is not present at the clarification plant, an alert is sent in real time to the field supervisor and a professional engineer and the operation can be immediately modified by an optimal operating program even from a remote site, so that the normal operating function of the purification facility can be easily maintained.

In this way, the technical back-up system and a quick response capacity are remarkably enhanced as compared with the conventional management of the purification facility and this enables the elevation of safety and stability and leads to the reduction in the maintenance and management cost.

DETAILED DESCRIPTION OF THE PREFERRED EMBODIMENTS

The present invention is described in detail below by referring to FIGS. 1 to 6.

The batch activated sludge process is first described. The batch activated sludge process for use in the present invention is a method of treating the wastewater generated in a hog farm or the like by using one reaction tank having therein a microorganism-containing activated sludge. Also, the batch activated sludge process comprises four steps separated in time, that is, (1) an inflow step, (2) an aeration step (aerobic), (3) a precipitation step (anaerobic) and (4) an effluence step. According to this process, the wastewater can be purified without dilution even when the BOD concentration of the wastewater (raw water) is as high as 10,000 to 50,000 mg/L. Also, those four steps are sequentially repeated in a reaction tank having a volume giving a BOD volume load of 0.1 to 0.4 kg/m$^3$·day so that the reaction tank fulfills denitrification and dephosphorization functions as well as BOD and COD. Usually, the four steps are repeated one to three times a day. In the case of performing these steps once a day, the aeration step and the precipitation step each is about 12 hours, in the case of twice a day, each is about 6 hours, and in the case of three times, each is about 4 hours. The inflow step and the effluence step vary depending on the amount of raw water but each is approximately from 15 to 30 minutes.

The inflow step is a step of passing wastewater generated in a hog farm or the like into a reaction tank. The aeration step is a step of constantly feeding an appropriate amount of air (oxygen) to the reaction tank (aeration), culturing an oxygen-loving microorganism with appropriate agitation, and oxidizing an organic substance by the effect of the microorganism. The precipitation step is a step of cutting off the inflow of oxygen into the reaction tank, and precipitating the activated sludge with denitrification in an anaerobic state. The effluence step is a step of collecting the supernatant of the reaction tank and discharging it as a treated water.

The control of the amount and quality of activated sludge and the aeration amount, with respect to the inflow load, and the control of the oxidation of BOD and COD, the oxidation (nitrification) of ammonia and the reduction (denitrification) of the resulting nitric acid and nitrous acid, are very important from the standpoint of maintaining the purification function in the reaction tank. If these controls are improper, the purification function for BOD, COD, SS and TN is impaired and a predetermined quality of treated water cannot be maintained. The control of the activated sludge is performed by a treatment of drawing excess sludge out of the system, but a constant concentration cannot be maintained at all times. The control of the inflow load is performed by disposing a raw water storage tank having a required capacity before the reaction tank and controlling the inflow into the reaction tank, but accurate equalization of the amount and quality cannot be attained.

Accordingly, the primary means of the operational management for a purification tank is, in the inflow, aeration, precipitation and effluence steps, to control the appropriate aeration intensity and aeration time without upsetting the timing based on the fluctuating raw water conditions and activated sludge amount, and thereby control the oxidation of BOD and COD, the oxidation (nitrification) of ammonia and the reduction (denitrification) of the resulting nitric acid and nitrous acid.

In this case, the meaning, which is understood from the waveform information in the sensor data, needs to be correctly evaluated without delay and fed back to the operating program, however, a lot of skill is required to make the judgment and create or modify the program and, when the supervisor is absent, the response is not possible. Thus, in the automatic control by a meter relay, there is a fear that the response is unsatisfactory or unstable. In this way, the stable maintenance of the purification function is often difficult. Furthermore, it is required to maintain the predetermined purification function with a minimum required electric power while not unnecessarily consuming electric power.

Figure 1:
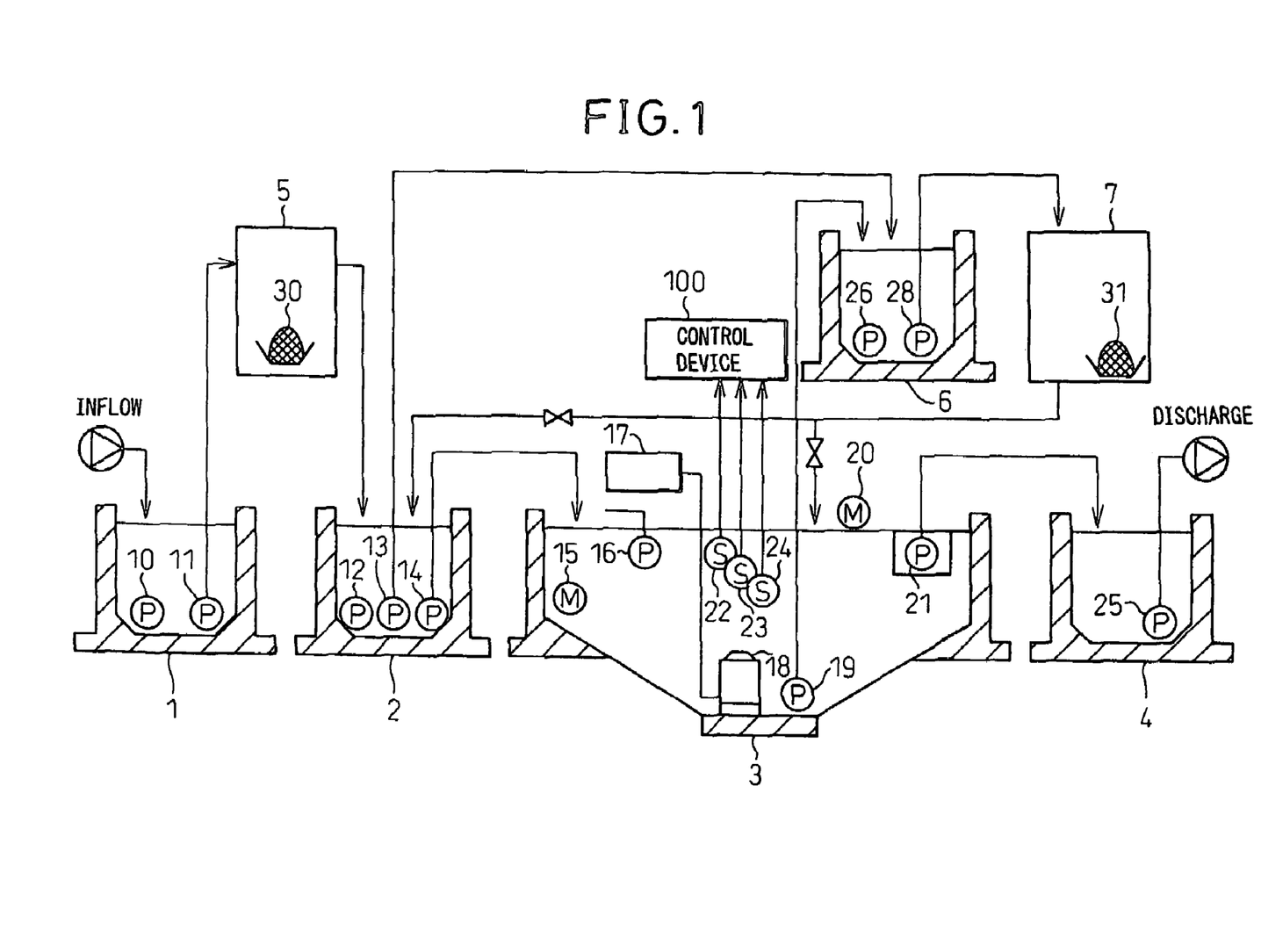
FIG. 1 is a schematic block diagram showing one example of the wastewater clarification plant using a batch activated sludge process.

FIG. 1 shows a schematic block diagram of the wastewater clarification plant by a batch activated sludge process.

As shown in FIG. 1, the wastewater purification plant comprises a raw water tank 1, a flow rate adjusting tank 2, a batch reaction tank 3, a treated water tank 4, a solid-liquid separator 5, a sludge storage tank 6, a dehydrator 7, and the like.

The raw water tank 1 is equipment for receiving wastewater from a wastewater source and transferring the wastewater to the solid-liquid separator 5 by a raw water pump 11. Depending on the quality of wastewater, an agitator 10 is preferably disposed.

The flow rate adjusting tank 2 temporarily pools the wastewater passed through the solid-liquid separator 5 and, at a time designated by the operating program, transfers the wastewater to the batch reaction tank 3 by using a flow regulating pump 14. In the case where much solid matter is contained in the wastewater passed through the solid-liquid separator 5, the raw water slurry built up on the bottom of the flow rate adjusting tank 2 is transferred to the sludge storage tank 6 by a slurry pump 13.

The batch reaction tank 3 may have a rectangular parallelepiped shape but preferably has a mortar-type cross-sectional shape and a circular or elliptical plan shape. The mortar-type cross-sectional shape is preferred in view of complete mixing in the batch reaction tank 3, acceleration of precipitation and consolidation of the sludge, and the elimination of dead space in aeration. The inclined part of the batch reaction tank 3 may be shielded from water by a concrete structure or a sheet of asphalt or the like.

The reaction tank 3 comprises an underwater mixer 15, a defoaming pump 16, a pressure blower 17 and an underwater aerator 18 disposed on the bottom of the batch reaction tank 3, which are used for both aeration and agitation, a sludge pump 19, a horizontal aerator 20, a water collecting device 21, a DO sensor 22, an ORP sensor 23 and a pH sensor 24.

The underwater mixer 15 is equipment for promoting the horizontal flow or accelerating the anaerobic agitation and is disposed near the wall of the reaction tank 3 or on the tank bottom.

The defoaming pump 16 is equipment for drawing in an activated sludge liquid and jetting it out from nozzles, thereby beating the bubbles on the water surface. The activated sludge liquid is cyclically utilized for the defoaming pump 16, because use of fresh water or treated water gives rise to an elevation in the water level of the reaction tank and use of fresh water requires a charge for the water.

The pressure blower 17 feeds air to the underwater aerator 18 through the piping connected thereto and forms a mainly up-down flow in the reaction tank 3, thereby aerating and agitating the activated sludge liquid. The aeration/agitation capacity, the number of units and the like of each of the pressure blower 17 and the underwater aerator 18 are determined according to the size of the reaction tank 3 and the oxygen amount required. The pressure blower 17 is controlled by a control device 100 as described later. Incidentally, various methods may be employed for the aeration and agitation in the reaction tank but, in the case where the water depth of the reaction tank is from 4 to 8 m, a combination of a pressure blower 17 and an underwater aerator 18 is effective. Particularly, in comparison with the case where the water depth is less than 4 m, when the water depth is from 4 to 8 m, the amount of oxygen introduced per 1 kwh of the electric power is improved by 60 to 70%.

The sludge pump 19 is an underwater pump for transferring the excess sludge to the sludge storage tank 6 and is disposed on the bottom of the reaction tank 3.

The horizontal aerator 20 is set afloat on the water surface of the reaction tank 3 and gives a horizontal flow to the activated sludge liquid, thereby providing, in combination with an up-down flow by the pressure blower 17 and the underwater aerator, an effect of completely mixing the activated sludge liquid in the reaction tank 3 and the inflow wastewater and enhancing the aerating efficiency. For the horizontal aerator 20, a float-type waterwheel, a float-type screw ejector, an ejector and the like may be used.

The water collecting device 21 is a device for drawing the supernatant water (treated water), appearing after the activated sludge is precipitated, and an underwater pump, a siphon, a movable weir and the like can be used therefor. The water collecting device 21 may also be a treated-water-drawing device for separating the sludge liquid in the reaction tank 3, or the sludge liquid transferred to a separately provided tank, into activated sludge and treated water by using a microfiltration membrane or an ultrafiltration membrane. The treated water drawn out is transferred to the treated water tank 4.

The DO sensor 22, ORP sensor 23 and pH sensor 24 are disposed in the water within the reaction tank 3 and each transmits a detected value to a control device 100 described later.

The treated water tank 4 is a tank for pooling the treated water. In the case of treatment by a batch activated sludge process, the treated water is drawn in bulk at certain time intervals and therefore, this equipment is necessary particularly when the water channel of the discharge destination cannot receive a sufficiently large flow volume. Also, when the level of the discharge regulation value for BOD, COD, SS and TP is high, an advanced treatment, for example, by a reverse osmosis membrane, a coagulation treatment, an activated carbon treatment or an ozone oxidation may be required in the latter stage of the activated sludge process. Such an advanced treatment is advantageously performed not by a batch process but by a continuous process and in this case, the treated water tank 4 serves as a conditioning tank for the advanced treatment. The treated water tank 4 discharges the treated water through a treated water pump 25. The treated water pump 25 may also be a drain pipe from a siphon or the tank bottom.

The solid-liquid separator 5 comprises a screen for removing miscellaneous trash 30 contained in the wastewater from the raw water tank 1. A screen with appropriate weave and scale spacing is selected according to the properties of the wastewater. The wastewater passed through the solid-liquid separator 5 is transferred to the flow rate adjusting tank 2. The miscellaneous trash 30 may also be recycled as compost.

The sludge storage tank 6 is equipment for storing the raw water slurry drawn from the flow rate adjusting tank 2 and the excess sludge drawn from the reaction tank 3 and supplies the sludge to the dehydrator 7 by a sludge supply pump 28. In order to supply homogeneous sludge to the dehydrator 7, a sludge agitator 26 is preferably used.

The dehydrator 7 is equipment for dehydrating the sludge supplied from the sludge storage tank 6 and separating it into supernatant water and dehydrated cake 31. The dehydrator 7 comprises, for example, a screw press, a belt press, a polydisc, a centrifugal separator or a filter press and utilizes a coagulant, and these are selected according to the property and state of the sludge, the desired water content of the dehydrated cake, or the like. The supernatant liquid is returned to the flow rate adjusting tank 2 or the reaction tank 3 but, when the object of dehydration is only excess sludge, after separating the solid matter by guiding the supernatant liquid to the precipitation tank (not shown), the filtrate may be discharged.

In each of the raw water tank 1, the flow rate adjusting tank 2, the batch reaction tank 3, the treated water tank 4 and the sludge storage tank 6, a water level relay is preferably provided so as to detect the water level of each tank. Also, as for the treated water quality, when an advanced treatment such as BOD, SS, COD, TP and chromaticity, or the destruction of bacteria, protozoa and the like is required, the wastewater purification plant shown in FIG. 1 preferably comprises an additional facility such as coagulation precipitation process, sand filtration, activated carbon treatment, ozone oxidation process, microfiltration membrane, ultrafiltration membrane or reverse osmosis membrane, or an additional facility comprising a combination thereof.

Figure 2:
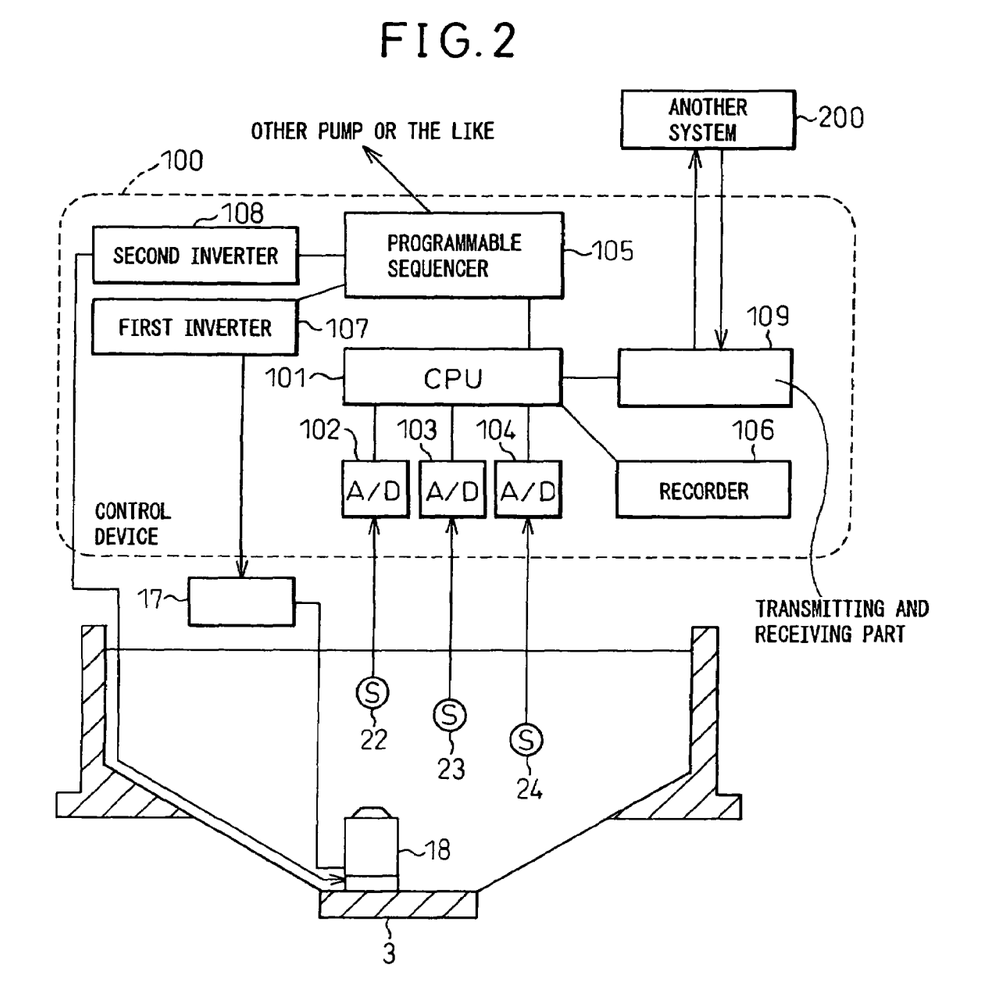
FIG. 2 is a view showing the details of the control device 100 shown in FIG. 1.

FIG. 2 shows the details of the control device 100 shown in FIG. 1.

As shown in FIG. 2, the control device 100 comprises, for example, CPU 101, A/D converters 102, 103 and 104 for converting the detection signals from the DO sensor 22, the ORP sensor 23 and the pH sensor 24 into digital data, a programmable sequencer 105, a recording part 106 for recording various sensor outputs on a recording paper sheet and/or displaying these on a display, a first inverter 107, a second inverter 108, and a transmitting and receiving part 109 for exchanging the data with another system 200.

The programmable sequencer 105 causes the first and second inverters 107 and 108 (electric power boards) and various drivers shown in FIG. 1 to work in the predetermined timing based on the previously set commands, whereby the above-described four steps of the batch activated sludge process are endlessly repeated. Incidentally, the first inverter 107 and the second inverter 108 control the pressure blower 17 and the underwater aerator 18, respectively. The programmable sequencer 105 may be a commercially available general-purpose product or a product dedicated to this system. Accordingly, the progress in the step at that point can be evaluated by the control status data of the programmable sequencer 105.

The CPU 101 constantly receives the control status of the programmable sequencer 105 and the detected data waveforms from the DO sensor 22, ORP sensor 23 and pH sensor 24 and, while performing the recording operation of the output by the recording part 107, analyzes the detected data waveform so that, at the occurrence of a problem, an alert can be generated and sent to another system 200 through the transmitting and receiving part 108. Here, W.A.R.P (weight associative rule processor) manufactured by SGS-THOMSON is used as the CPU 101 for the waveform analysis, but another appropriate processor may also be used. The details of the waveform analysis are described later.

The other system 200 is usually disposed at a remote site where a supervisor or a professional engineer is stationed, and is connected to the CPU 101 and the programmable sequencer 105 through the transmitting and receiving part 108 so that, when an alert is generated as a result of the waveform analysis, an appropriate care can be exercised. For example, when the waveform analysis reveals that the batch activated sludge process is not appropriately functioning, the program of the programmable sequencer 105 is modified through the transmitting and receiving part 108 and the CPU 101, and the control of the wastewater purification plant shown in FIG. 1 is modified so as to more properly perform the treatment. Incidentally, it is also possible for a supervisor or a professional engineer to adjust the programmable sequencer 105 directly in the field.

The waveform analysis performed in the CPU 101 is described below.

The waveform analysis is performed, for example, by CPU 101 while utilizing predetermined ROM, RAM and the like according to the program previously stored in a given memory.

Figure 3:
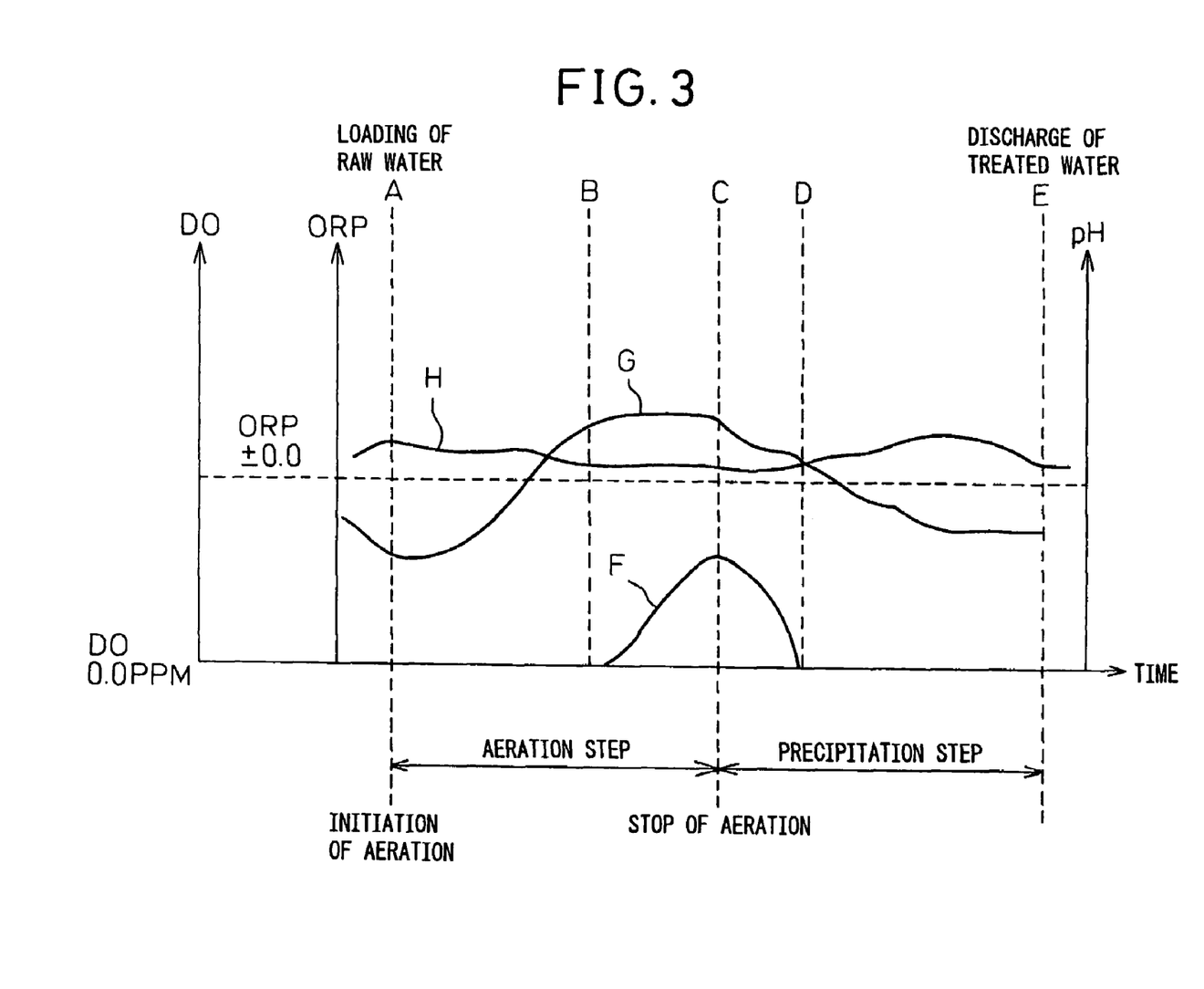
FIG. 3 is a view showing data examples.

FIG. 3 shows data examples created by using the control status received from the programmable sequencer 105 and the data waveforms from various sensors 22 to 24. In FIG. 3, the abscissa indicates the time, and the ordinates indicate DO (PPM), ORP (mv) and pH, respectively.

In the Figure, A denotes the time where the transfer of the raw water (wastewater) to the reaction tank 3 from the flow rate adjusting tank 2 is started and, at the same time, the aeration step by a pressure blower 17, an underwater aerator 18 and the like is initiated. In the Figure, C denotes the previously fixed time where the aeration step is terminated and the precipitation step is initiated, and E denotes the time where the precipitation step is terminated and the discharge of the treated water is started. Also, in the Figure, B denotes the time where 70% of the aeration step has passed from the initiation of the aeration step, and D denotes the time where 105% of the aeration step has passed from the initiation of the aeration step.

Furthermore, in the Figure, F denotes the DO value sensed by the DO sensor 22, G denotes the ORP value sensed by the ORP sensor 23, and H denotes the pH value sensed by the pH sensor 24.

The CPU 101 is programmed to check these data waveforms with the previously determined data waveform conditions and when an undesired waveform appears, generate an alert.

Figure 4:
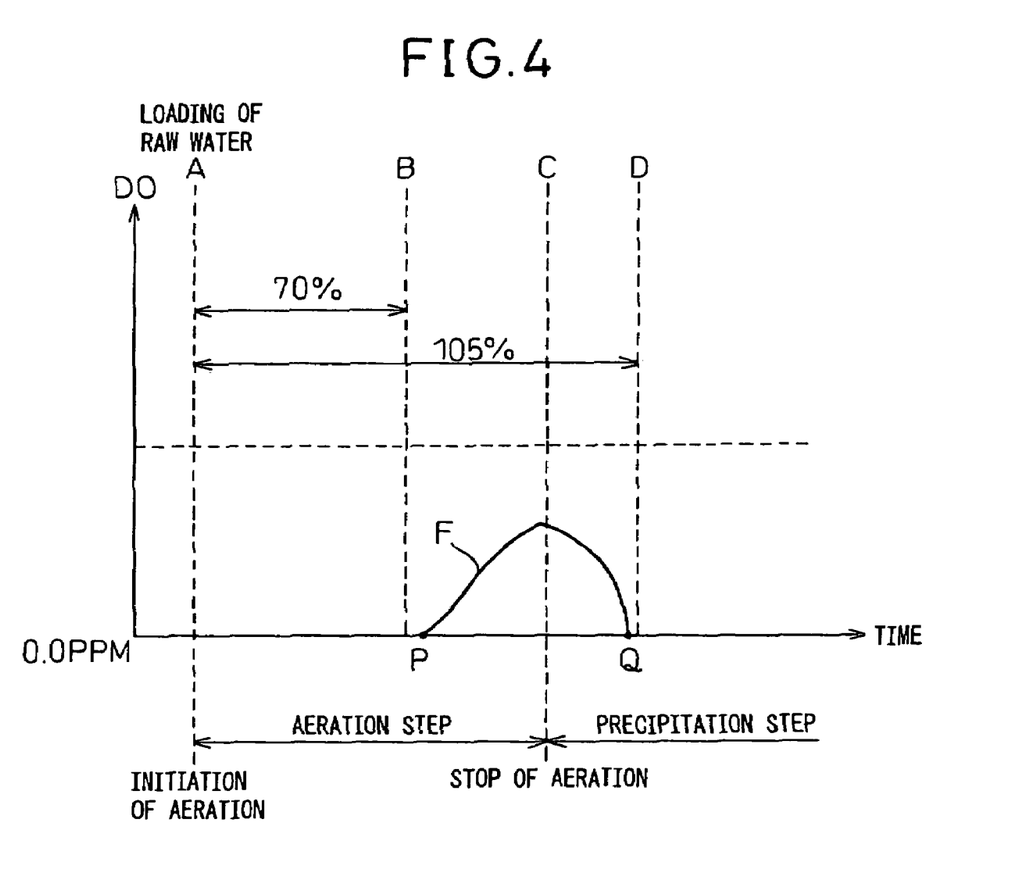
FIG. 4 is a view for explaining the waveform analysis regarding DO.

The waveform analysis regarding the DO value sensed by the DO sensor 22 is described by referring to FIG. 4. As for the data waveform F of the DO value, when the DO value rises after the passing of 70% of the aeration step from the initiation of aeration (see, P in the Figure) and the DO value again returns to "0" before the passing of 105% of the aeration step from the initiation of aeration (see, Q in the Figure), the DO value is judged as normal.

This is because a best purification function is exerted in the case where the DO value starts rising from the time close to the termination of the aeration step (after the passing of 70% of the aeration step from the initiation of aeration) and the DO value acutely returns to 0 immediately after the termination of the aeration step (before the passing of 105% of the aeration step from the initiation of aeration).

Since the oxygen charged (oxygen fed by a pressure blower 17 or the like) is 100% consumed until $BOD/NH_4$—N is sufficiently oxidized, the DO value is 0. Accordingly, the DO value indicates the excess oxygen. However, no rise in the DO value indicates that oxidation is not completed. Also, when the aeration is stopped, the remaining oxygen is consumed by the respiration of the activated sludge and therefore, the DO value becomes 0. That is, despite a wish to confirm that the DO value once rises for sufficient oxidation, it is unprofitable to feed too much excess oxygen. In this way, the purification function is best exerted when the DO value starts rising from the time close to the termination of the aeration step and the DO value acutely returns to 0 immediately after the completion of the aeration step.

Figure 5:
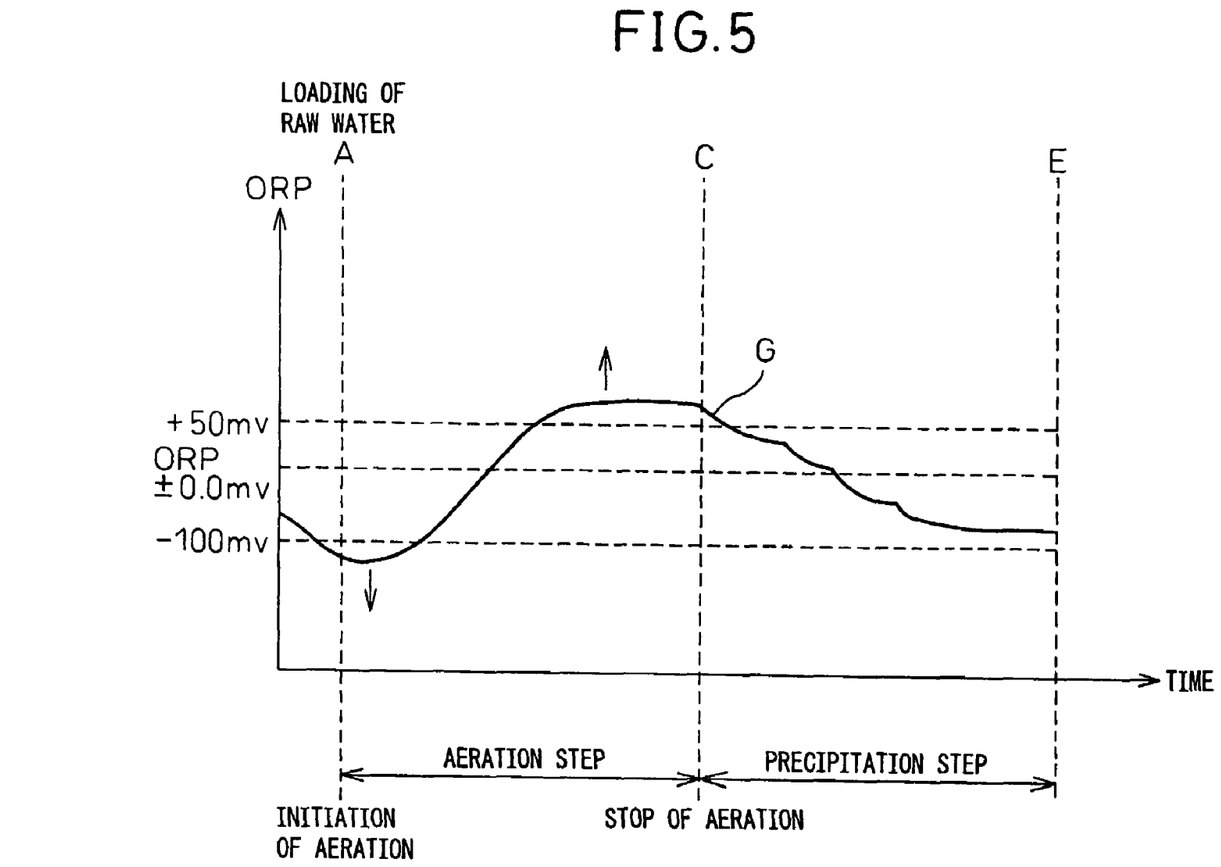
FIG. 5 is a view for explaining the waveform analysis regarding ORP.

The waveform analysis regarding the ORP value sensed by the ORP sensor 23 is described by referring to FIG. 5. As for the data waveform G of the ORP value, when between the initiation of aeration and the stop of aeration, the plus side first has a portion of +50 mv or more and the minus side thereafter has a portion of −100 mv or less, the data waveform of the ORP sensor is judged as normal.

This is because an ORP value of +50 mv or more indicates that the oxidation of $BOD/NH_4$—N is sufficiently effected, whereas an ORP value of −100 mv or less indicates that the reduction of $NO_2$ and $NO_3$—N is sufficiently effected and denitrification is fulfilled.

Figure 6:
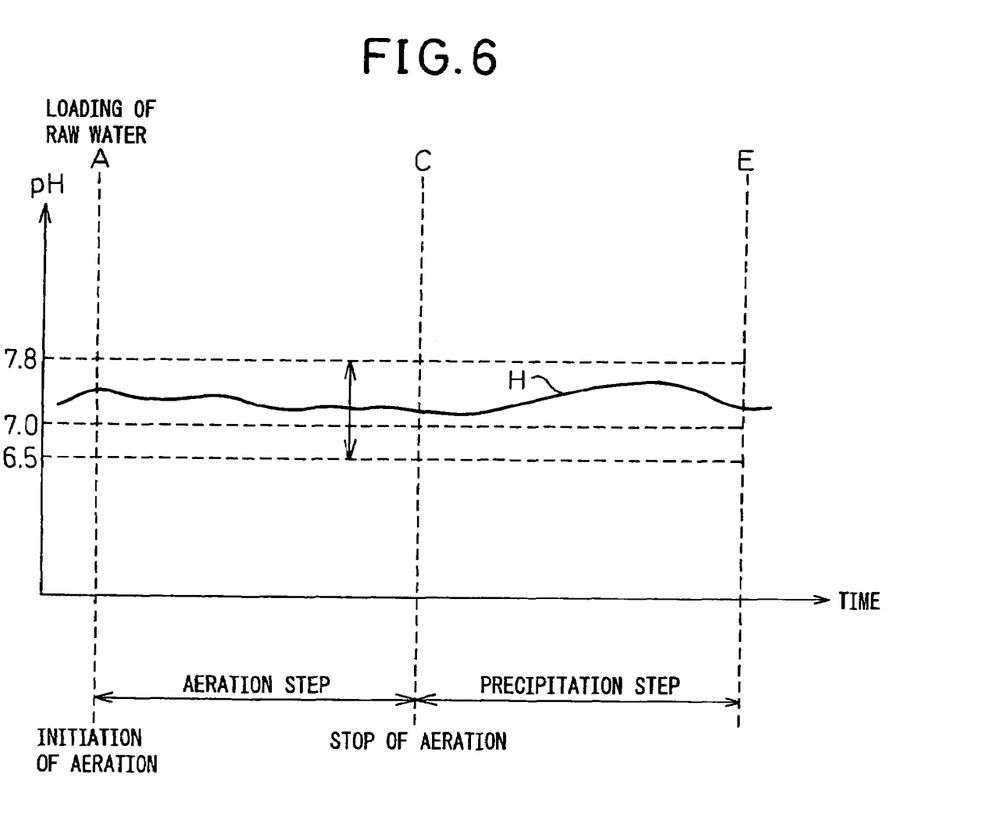
FIG. 6 is a view for explaining the waveform analysis regarding pH.

The waveform analysis regarding the pH value sensed by the pH sensor 24 is described by referring to FIG. 6. As for the waveform data H of the pH value, when the pH value is from 6.5 to 7.8 in all steps, the data waveform of the pH sensor is judged as normal.

This is because a pH value of more than 7.8 indicates that the oxidation of $NH_4$—N is insufficient, whereas a pH value of less than 6.5 indicates that the reduction of $NO_2$ and $NO_3$—N is not sufficiently effected.

The CPU 101 is programmed to perform an alarm process, such as outputting of various signals, when the number of occurrences where any one of the data waveforms from the DO, ORP and pH sensors deviates from the normal according to the conditions shown in FIGS. 4 to 6 is 3 or more a week. The number of occurrences (3 occurrences/week) of deviation from the normal is one example, and an appropriate value can be selected according to the scale or type of the system or wastewater purification plant.

The invention claimed is:

1. A method for controlling a wastewater purification system for purifying wastewater by a batch activated sludge process, the wastewater purification system including a reaction tank containing an aeration device, a programmable sequencer for controlling said aeration device, a first sensor for detecting the dissolved oxygen concentration disposed in said reaction tank, a second sensor for detecting the oxidation-reduction potential disposed in said reaction tank, a third sensor for detecting the hydrogen ion concentration disposed in said reaction tank and a controller, the method comprising the steps of:

controlling said aeration device by said programmable sequencer;

acquiring, in said controller, respective data waveforms from said first sensor, said second sensor and said third sensor, and control status data of said programmable sequencer;

analyzing, in said controller, said data waveform of dissolved oxygen concentration from said first sensor, said data waveform of oxidation-reduction potential from said second sensor, and said data waveform of hydrogen ion concentration from said third sensor, and performing in said controller, an alarm process when a deviation from a previously fixed normal state is discovered as a result of said analysis.

2. The method for controlling a wastewater purification system according to claim 1, wherein said controller discovers said deviation from the normal state by comparing said data waveform of dissolved oxygen concentration, said data waveform of oxidation-reduction potential and said data waveform of hydrogen ion concentration with previously prepared reference conditions.

3. The method for controlling a wastewater purification system according to claim 1, further comprising a step of recording, in said controller, said data waveform of dissolved oxygen concentration, said data waveform of oxidation-reduction potential and said data waveform of hydrogen ion concentration.

4. The method for controlling a wastewater purification system according to claim 1, wherein said alarm process automatically transmits the occurrence of an abnormality to a remote site over a phone line.

5. The method for controlling a wastewater purification system according to claim 1, wherein the program of said programmable sequencer can be modified.

6. The method for controlling a wastewater purification system according to claim 1, wherein the program of said programmable sequencer can be modified from a remote site.

7. The method for controlling a wastewater purification system according to claim 1, wherein said wastewater purification system further includes a solid matter-removing device, a raw water tank, a raw water storage tank, a treated water-drawing device, and an extracting and dehydrating device for excess activated sludge.

8. The method for controlling a wastewater purification system according to claim 1, wherein said wastewater purification system further includes a device for separating the treated water from the activated sludge by using a microfiltration membrane, an ultrafiltration membrane or a reverse osmosis membrane, which is disposed in said reaction tank or separately therefrom.

9. The method for controlling a wastewater purification system according to claim 1, wherein said reaction tank has a circular or elliptical plan shape and a mortar-type cross-sectional shape and has an inclined part shielded from water by concrete or an asphalt sheet.

10. The method for controlling a wastewater purification system according to claim 1, wherein the BOD volume load of said reaction tank is from 0.1 to 0.4 $kg/m^3 \cdot day$.

* * * * *

UNITED STATES PATENT AND TRADEMARK OFFICE
CERTIFICATE OF CORRECTION

PATENT NO. : 7,494,588 B2  
APPLICATION NO. : 10/585908  
DATED : February 24, 2009  
INVENTOR(S) : Sakujiro Nakamura Page 1 of 1

It is certified that error appears in the above-identified patent and that said Letters Patent is hereby corrected as shown below:

On the Title Page

Item (30) Foreign Application Priority Data

Insert --(30) Foreign Application Priority Data January 13, 2004 (JP)...........2004-005303--

Signed and Sealed this

Thirtieth Day of June, 2009

JOHN DOLL  
*Acting Director of the United States Patent and Trademark Office*